United States Patent
Musgrove et al.

(10) Patent No.: US 10,032,207 B2
(45) Date of Patent: Jul. 24, 2018

(54) PRODUCT PLACEMENT ENGINE AND METHOD

(71) Applicant: CBS Interactive Inc., San Francisco, CA (US)

(72) Inventors: Timothy A. Musgrove, Morgan Hill, CA (US); Robin Hiroko Walsh, San Francisco, CA (US)

(73) Assignee: CBS INTERACTIVE INC., San Francisco, CA (US)

( * ) Notice: Subject to any disclaimer, the term of this patent is extended or adjusted under 35 U.S.C. 154(b) by 0 days.

(21) Appl. No.: 15/236,926

(22) Filed: Aug. 15, 2016

(65) Prior Publication Data

US 2017/0221122 A1    Aug. 3, 2017

Related U.S. Application Data

(60) Continuation of application No. 14/665,860, filed on Mar. 23, 2015, now Pat. No. 9,443,254, which is a continuation of application No. 12/366,950, filed on Feb. 6, 2009, now Pat. No. 9,015,182, which is a division of application No. 10/911,733, filed on Aug. 5, 2004, now Pat. No. 7,505,969.

(60) Provisional application No. 60/492,327, filed on Aug. 5, 2003.

(51) Int. Cl.
*G06F 17/30* (2006.01)
*G06Q 30/06* (2012.01)

(52) U.S. Cl.
CPC ..... *G06Q 30/0629* (2013.01); *G06F 17/3089* (2013.01); *G06F 17/30864* (2013.01); *G06Q 30/0603* (2013.01)

(58) Field of Classification Search
USPC .......................... 707/759, 760; 715/513–514
See application file for complete search history.

(56) References Cited

U.S. PATENT DOCUMENTS

2003/0217335 A1* 11/2003 Chung ................ G06F 17/2785
715/206

* cited by examiner

*Primary Examiner* — Hung T Vy
(74) *Attorney, Agent, or Firm* — Rimon, P.C.; Marc S. Kaufman

(57) ABSTRACT

A product placement engine and method for automatically identifying products for association with a document, the engine including a parser, an analysis module adapted to determine word scores and to adjust the word scores of the words by predetermined weightings, a keyword constructor module adapted to construct a keyword query search string using words having the highest word scores, a search engine adapted to search a products database having product records to identify products satisfying the keyword query search string and assign product scores, and a post processing module adapted to identify word matches in each of the product records and the document and update the product score.

14 Claims, 2 Drawing Sheets

PRODUCT PLACEMENT ENGINE AND METHOD

CROSS REFERENCE TO RELATED APPLICATIONS

This application is a Continuation of U.S. patent application Ser. No. 14/665,860, filed on Mar. 23, 2015 (now pending), which is Continuation of U.S. patent application Ser. No. 12/366,950, filed on Feb. 6, 2009, now U.S. Pat. No. 9,015,182, which is a Divisional of U.S. patent application Ser. No. 10/911,733, filed on Aug. 5, 2004 now U.S. Pat. No. 7,505,969, which claims priority to U.S. Provisional Application No. 60/492,327, filed Aug. 5, 2003, the disclosures of which are hereby incorporated herein by reference in their entirety.

BACKGROUND OF THE INVENTION

Field of the Invention

The present invention is directed to a product placement engine system and method that analyzes a document such as a web page to extract information regarding the content of the document, and identify any relevant products or services that relate to the document.

Description of Related Art

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software viewers known as browsers and HTTP (hypertext transfer protocol) which allow a simple GUI (graphical user interface) to be used to communicate over the Internet. Browsers generally reside on the computer used to access content on the Internet, i.e. the client computer. HTTP is a component of TCP/IP and provides users access to files of various formats using a standard page description language known as HTML (hypertext markup language), XML (extensible markup language), and XHTML (extensible hypertext markup language). The collection of servers on the Internet using HTTP has become known as the "World Wide Web" or simply the "web."

Through HTML, XHTML, and interactive programming protocols, the author of a particular web page is able to make information available to viewers of the web page by placing the web page on an Internet web server. A client computer running a browser can request and display a web page stored on a web server by issuing a URL request through the Internet to the web in a known manner Such a web page typically incorporates both textural and graphical information including embedded hyper-text links and/or embedded applets, written in Java™ or another programming language.

As known and appreciated in the art, there are presently millions of web pages with various content. Tools have been developed to allow the user to search these web pages to obtain the various web pages having the various content of interest. One way to locate the desired web pages is to use a "search engine" which will search for web pages having a particular keyword or keywords. When a user seeking information from the web types in a keyword(s) in a search field of the search engine, the search engine's software program then utilizes algorithmic functions and criteria to find keyword matches in the information stored in the databases. The software program then sorts through the results of the search and provides a prioritized set of results to the user based on relevancy of the web page. Various search engine software programs differ in their methods used for determining a web page's relevancy. For example, the software may view the "meta tag" of the page, include a counter for counting the number of keyword occurrences on the text of the page, and/or consider the web page's popularity as well as other factors such as whether the webmaster of the web page has made special arrangements to have the web page displayed as a result of the search.

One of the primary applications of the web has been for shopping, i.e. the purchase of goods and services, i.e. products. Virtually every major commercial "bricks and mortar" merchant has established a web site for the showcase and sale of their products. Furthermore, many manufacturers sell products directly over the web. Finally, a plethora of on-line merchants, not previously existing in the bricks and mortar world, have come into existence. As a result, virtually every product is available for purchase over the web from a plurality of merchants. This situation has increased the efficiency of markets by permitting shoppers to readily compare products and terms of sale from plural merchants without the need to travel physically to the merchant locations.

Presently, when a consumer accesses a merchant's web site to research a particular product, only information regarding the particular product being researched is provided. Although the consumer may desire to research and identify an alternative product similar to the particular product being researched, tools for facilitating identification of such products are generally not available. For example, to obtain information regarding an alternative product in merchant websites, the consumer is typically required to display a listing of all of the products in a particular category, and to select an product to thereby display detailed information regarding the selected product. However, this selection is done by the consumer without information as to whether the newly selected product is comparable to the researched product.

Some merchant websites such as www.bestbuy.com provide a boxed window that may be entitled "Also Consider" or the like which identifies an alternative product for the consumer's consideration in a page displaying detailed information regarding a product that was selected by the consumer. The identified product is implemented as a link which may be selected by the consumer to obtain detailed information regarding the product. However, the boxed window is implemented to merely identify products offered by the same manufacturer of the originally selected product, and identifies products having nearly identical specification that may only differ nominally, for example, color of the trim, or to a product from the same manufacturer having increased capacity of a particular feature, for example, memory capacity.

Furthermore, the product that is identified to the user is typically manually linked to the web page displaying the originally selected product. This manual linking of one page to another is time consuming and a certain level of knowledge and experience is required for the administrator or other personnel to select an appropriate product that is truly comparable to the selected product. Such requirements further increase the cost for identifying such products.

The above described merchandizing technique depends also on the targeted web page being already discretely tied to a particular product, which product forms the basis of matching and comparison. In practice, many other web pages would be acceptable venues for associated merchandizing. However, most web pages do not have any particular product associated thereto or have any products mentioned at all in the web page. If there is no product that is associated to a web page, the product specification-based matching and comparison is entirely non-applicable. For example, the web page may be a review of a concert by a rock band. Because there are no products in the web page, presently known methods for product specification-based matching and comparison cannot be applied. However, such a web page would still be an appropriate venue for associated merchandizing for products related to music, for example, an MP3 player.

U.S. Pat. No. 6,122,647 to Horowitz et al. discloses a system, method, and software product that create contextual hypertext links relevant to a user selected portion of a source document. The contextual links enable the user to dynamically associate the source document with any available target document, regardless of whether links were created between the source document and the target document when the source document was created. The method includes selecting terms relevant to the user selected portion by linguistic analysis which selects the most frequently occurring terms. From the selected terms, target documents relevant to the selected terms are identified. The target documents are selected by identifying topics that are associated with, or described by, the selected terms. Contextual links are created between the selected terms and target documents associated with the identified topics using the URLs for the documents in the contextual links. The system includes a knowledge base of topics, including hierarchical relations between topics, and associations of topics and terms. A document collection includes documents and references to documents, and URL or other addressing information for the documents. A tagging module receives a user selected portion and selects terms to be used for the contextual links. A presentation module identifies the topics in the knowledge base associated with the selected terms, the documents associated with each topic, and creates the hypertext links between the terms and the documents.

Presently, no systems or methods are available for substantially automatically identifying relevant products that can be associated to the content of a web page document, especially if there are no products associated to the web page document. Therefore, there exists an unfulfilled need for a system and method for minimizing the above noted disadvantages associated with present systems and methods for identifying relevant products. In addition, there exists an unfulfilled need for such a system and method that minimizes cost and can perform these tasks substantially automatically with minimal input from the administrator or other personnel, and that can do so even where there is no prior associated product for the web page document.

SUMMARY OF THE INVENTION

Almost any business or enterprise which possesses and uses a product catalog, has also a mechanism for searching that catalog, and said mechanism is nearly always a Boolean keyword search engine of some form. Most of these systems are very mature in that they enjoy the benefit of many years of profiling and efficiency optimization as regards to their speed, reliability, maintainability, etc. The present invention described herein has the advantage of utilizing and leveraging the investment in such a mechanism, by lending itself to a pre- and post-processing paradigm, wherein all the methods are implemented before and after the execution of search into the product catalog, for example, a Boolean keyword search. The pre-processing results in a keyword string which then functions as the input to the keyword search, which is executed over the product catalog database. Such a search results in a list of candidate product records, each with a preliminary score based on the keyword match relevancy as outputted by the search engine. These results become the input for post-processing. Thus, the existing keyword search does much of the intensive database processing that is necessary, so further processing such as the application of computational linguistics and other advanced techniques, is performed by modules of the present invention. This allows rapid deployment into enterprise systems which already possess, and are familiar with, their own catalog search mechanism.

In view of the foregoing, one exemplary embodiment of the present invention is a method of automatically identifying products for association with a document including the steps of providing a products database having product records containing information regarding an associated product, parsing a document, determining word scores of the words in the document based on the frequency of the words in the document, adjusting the word scores of the words by predetermined weightings corresponding to the use of each word in the document, constructing a keyword query search string using words having the highest word scores, searching the product records of the products database to identify products satisfying the keyword query search string, assigning product scores to the identified products based on matches to the keyword query search string, parsing the product records to identify word matches in each of the product records and the document, updating the product score by processing the adjusted word scores corresponding to the matched word with the product score of the product for which word matched, and selecting products from the identified products that have the highest updated product scores.

Another exemplary embodiment of the present invention is a product placement engine for automatically identifying products for association with a document including a parser adapted to parsing a document, an analysis module adapted to determine word scores of the words in the document based on the frequency of the words in the document, and to adjust the word scores of the words by predetermined weightings corresponding to the use of each word in the document, a keyword constructor module adapted to construct a keyword query search string using words having the highest word scores, a search engine adapted to search a products database having product records containing information regarding an associated product to identify products satisfying the keyword query search string and assign product scores to the identified products based on matches to the keyword query search string, and a post processing module adapted to identify word matches in each of the product records and the document and update the product score by processing the adjusted word scores corresponding to the matched word with the product score of the product for which word matched.

Yet another exemplary embodiment of the present invention is computer readable medium for automatically identifying products for association with a document including instructions for parsing a document, instructions for determining word scores of the words in the document based on the frequency of the words in the document, instructions for adjusting the word scores of the words by predetermined weightings corresponding to the use of each word in the document, instructions for constructing a keyword query search string using words having the highest word scores, instructions for searching a products database having product records containing information regarding an associated product to identify products satisfying the keyword query search string, instructions for assigning product scores to the identified products based on matches to the keyword query search string, instructions for parsing the product records to identify word matches in each of the product records and the document, instructions for updating the product score by processing the adjusted word scores corresponding to the matched word with the product score of the product for which word matched, and instructions for selecting products from the identified products that have the highest updated product scores.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
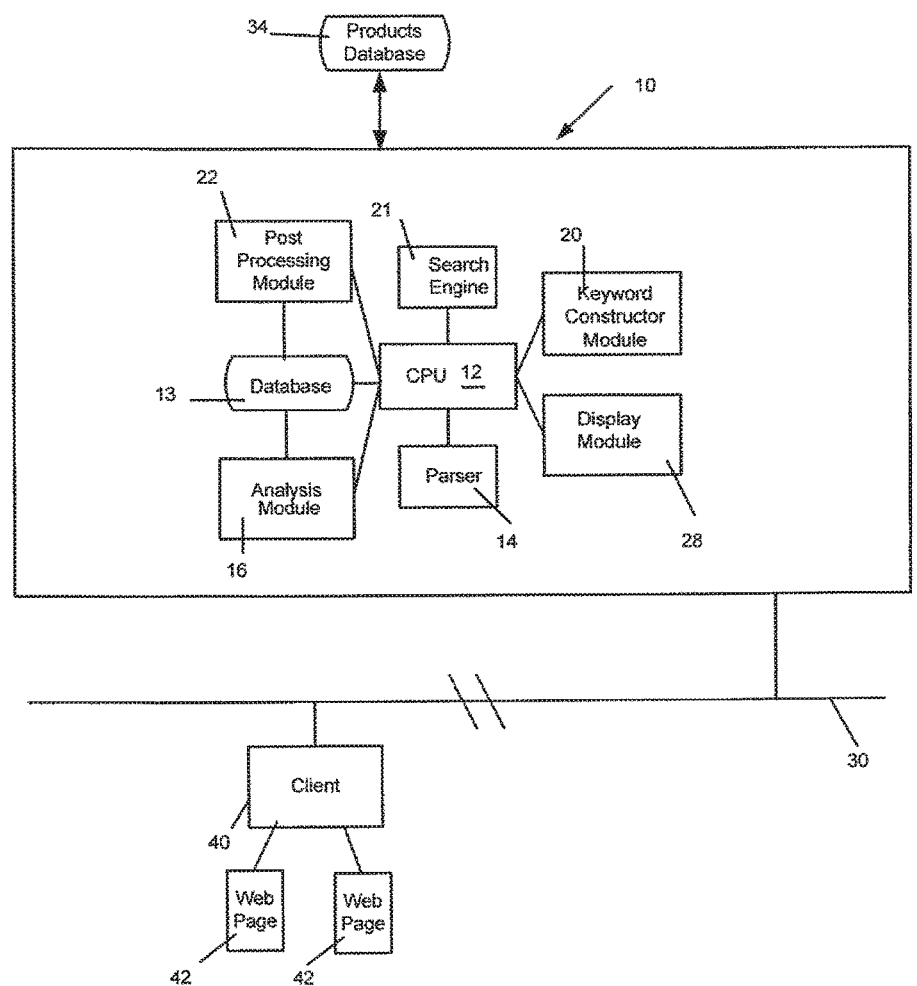
FIG. 1 is a schematic illustration of a product placement engine in accordance with one example embodiment of the present invention.

FIG. 1 shows a schematic illustration of a product placement engine system 10 ("product placement engine") in accordance with one example embodiment of the present invention that minimizes the above noted disadvantages associated with present systems and methods for identifying appropriate products for a particular document such as a web page. It should be noted that whereas the embodiment of the present invention is specifically discussed for analyzing web pages which are documents published or accessible through the web, it should be understood that the present invention is not limited thereto but may be used for analysis of any documents to associate products to the document. However, as will be evident from the discussion below, the present invention is especially advantageous when implemented to analyze web page documents.

As described in further detail below, the product placement engine 10 associates products from a catalog or a database of products to a web page, even if the web page does not mention any particular product or is not discretely associated with a product. In this manner, the product placement engine 10 also minimizes cost associated with identifying appropriate products, and can perform these tasks substantially automatically with minimal input from the administrator or other personnel.

In accordance with the illustrated embodiment of the present invention, the product placement engine 10 is provided with a central processing unit 12 (hereinafter "CPU") which is adapted to control and/or facilitate functions of various modules of the web page 10 as described in detail below. It should be initially noted that the product placement engine 10 of FIG. 1 may be implemented with any type of hardware and software, and may be a pre-programmed general purpose computing device. For example, the product placement engine 10 may be implemented using a server, a personal computer, a portable computer, a thin client, or any other appropriate computational devices. The product placement engine 10 may be a single device at a single location as shown in the example embodiment of FIG. 1, or be implemented as multiple devices at a single, or multiple, locations that are connected together using any appropriate communication protocols over any communication medium such as electric cable, fiber optic cable, any other cable, or in a wireless manner using radio frequency, infrared, or other technologies.

The product placement engine 10 is connected to a network 30 that allows remote access to the product placement engine 10 to allow exchange of data and information between the product placement engine 10 and other devices connected to the network 30. The network 30 allows the product placement engine 10 to access client websites that utilize the function and services provided by the product placement engine 10. The network 30 may be any type of communications channel, such as the Internet or the World Wide Web, a local area network (LAN), a wide area network (WAN), direct computer connections, and may be accomplished in a wireless manner using radio frequency, infrared, or other technologies, using any type of communication hardware and protocols.

In one example implementation, the product placement engine 10 is engaged when a client requests the results of the analysis for a given document. For example, this could be accomplish using a Javascript include on the client's webpage. The input to the product placement engine 10 may be the fully qualified location of the document itself, in this case, the URL on the client's website. The document location is pre-processed in order to guarantee its uniqueness so as not to have the product placement engine 10 analyze the same document more than once. This may include recognizing and stripping standard web session identifiers from the URL, for example. Once the document location is cleansed, it may then be regarded as a key. When the client requests the results from the product placement engine 10 for a given document, the system looks to see if the analysis has been completed by looking in database 13, and if so, returns those results. Otherwise, the product placement engine 10 performs the analysis. If the analysis cannot be accomplished in real-time, the system returns an appropriate set of default products references as place holders. This process continues until the product placement engine 10 completes the analysis for said document, and places the results in database 13.

In the illustrated embodiment, a client's website 40 is connected to the network 30, the client can be any party having web pages 42 that are published or otherwise accessible through the network 30. For example, the web page may be about cameras generally, and more specifically, setting the aperture of a camera in general, but may or may not identify a specific model of a camera. The product placement engine 10 of the present invention allows targeting of such a web page with products associated with photography which will likely be related to the content of the web page. A set of links to product pages on a comparison shopping service such as www.shopper.com may be generated by the product placement engine 10 and provided to the client website 40. It should be noted that whereas only one client website 40 is shown as being connected to the network 30 in the illustrated example of FIG. 1, other additional client websites may be connected to the network 30 as well.

The product placement engine 10 is connected to, or otherwise has access to, a products database 34 that includes detailed information regarding various products from which the product placement engine 10 selects as being relevant to a particular web page. The products database 34 may be structured in any appropriate manner and the products cataloged to expedite searching and retrieval of products and product information.

The product placement engine 10 is provided with a processor 12 that provides processing support to the various components of the product placement engine 10, and a database 13 for allowing storage of various data, information, and constants that are used, derived, or analyzed by the product placement engine. In this regard, the product placement engine 10 is provided with a parser 14 that is adapted to parse web pages into constituent parts (title, main body, etc.) that make up the web page.

The product placement engine 10 of the illustrated embodiment also includes an analysis module 16 that analyzes the parsed web page to build a word analysis map of the most prominent words and phrases. Such words and phrases are used by a keyword constructor module 20 to construct a keyword query that is queried to the products database 34. A search engine 21 is also provided for searching and retrieving product records from the products database 34 that satisfy the keyword query. The products are scored based on matches to the keyword query.

The product placement engine 10 also includes a post-processing module 22 that further analyzes the product records retrieved from the products database 34. The post-processing module 22 re-scores the products that are identified and retrieved by the search engine 21. The re-scored products are ranked and the highest ranking results are provided to a display module 28 which prepares a product placement unit such as an ad or a link embedded within, or otherwise associated with, the web page that was analyzed. The functions of each of these modules of the product placement engine 10 are discussed in further detail below.

It should be understood that these modules are merely schematically illustrated and discussed based on their function for clarity purposes only, and do not necessary represent specific hardware or software of the product placement engine 10. In this regard, these modules may be hardware and/or software implemented and substantially perform the particular functions explained. Moreover, two or more of these modules may be combined together within the product placement engine 10, or alternatively, modules may be divided into different modules based on the particular function desired. Thus, the present invention as schematically embodied in FIG. 1 should not be construed to limit the product placement engine 10 of the present invention.

The parser 14 and the analysis module 16 work together to initially obtain and analyze the contents of the web page on client's website to identify various keywords in the web page. In the preferred embodiment of the present invention, the parsing and analysis of the web page by the parser 14 and the analysis module 16 are attained by initially counting the frequency and observing the formatting characteristics of the words in the parsed web page as described in further detail below. It should be noted that as used herein, the terms "word" or "words" refer to individual words as well as to "lexicon headword entries" which can include single words, and also 2- or 3-word collocations, for example, "Sony PlayStation," "Sound Blaster" or "United States".

In the preferred embodiment, observations of "stop words" occurring in the main body of the web page are not counted and are ignored. Examples of such stop words may include prepositions, articles, negations, special words like "www", ".com," etc. These stop words may be provided in a list that is stored in the database 13 for retrieval and reference by the analysis module 16. Moreover, stemming and inflection lists may further be provided in the database 13 which are used by the analysis module 16 to ensure variations of the same word are counted as a single word instead of as different words. For example, the words "running" and "ran" may be listed as a variation of "run" and thus, are counted as instances of the same word. Finally, in the illustrated embodiment, numbers within the web page may be ignored by the analysis module 16 unless the numbers are determined to be a part of product model names.

A word analysis map is generated by the analysis module 16 for every word in the web page being analyzed, each word having a frequency object that stores analysis information regarding a particular word as used in the web page. In this regard, the analysis map may be implemented using the following data structure shown in TABLE 1:

TABLE 1

Keyword Analysis Object: Data Structure

| Name | Type | Function |
| --- | --- | --- |
| FRQTotal | Unsigned integer | Total number of instances of word in document |
| FRQUpCase | Unsigned integer | Number of instances with no lower case (e.g. "IBM") |
| FRQLoCase | Unsigned integer | Number of instances with all lower case letters and no numbers (e.g. "boy") |
| FRQLeadCaps | Unsigned integer | Number of instances with leading caps (e.g. "Apple") |
| FRQMidCaps | Unsigned integer | Number of instances having some but not all capital letters, other than leading caps (e.g., "iPod") |
| IsNumAlpha | Boolean | Is word a mixture of letters and numbers (e.g. 'nr7000") |
| EmphasisCases | Unsigned integer | Number of instances having emphasis |
| WordScore | Unsigned integer | Final word score based on the counts of the occurrences and special bonuses/penalties. |

As shown, the word analysis map data structure of TABLE 2 sets forth various frequency information regarding a particular word, such information being defined by objects in the Name column, as well as the object Type. The Function column is provided to facilitate understanding of the objects referred to in the word analysis map. The word analysis map serves as a working space to record characteristics of the word as found in the web page during the parsing and analysis by the parser 14 and the analysis module 16. The "WordScore" object is a tally of points for the particular word or phase, the points being updated (increased or decreased) in the manner described in further detail below. Of course, the above described frequency map and the corresponding data structure are merely one example embodiment of how the present invention may be implemented, and the present invention is not limited thereto.

Each of the words in the web page that is parsed and analyzed are weighted so that the word score for each of the words are adjusted based on various assigned points in accordance with the words' occurrence and use in the web page. The results of the analysis recorded into the word analysis object map of the corresponding words. In the example embodiment described herein, each of the words are weighted based on the constants listed in TABLE 2:

TABLE 2
of Constants Defined

| Name | Weight | Decay |
|---|---|---|
| TitlePoints | 50 | 50 |
| Points assigned for a word found in the document title (appearing in the window bar on the browser). | | |
| SubtitlePoints | 30 | 50 |
| Points assigned for a word appearing in a major heading or subheading within the web document (e.g. H1 or H2 tags in HTML) | | |
| MetaKWPoints | 20 | 50 |
| Points assigned for a word appearing in the meta-tag "keywords" or in the inferred set of keywords for the document. | | |
| MetaDescPoints | 40 | 50 |
| Points assigned for a word appearing in the meta-tag "description" or in a document summary paragraph. | | |
| AncestryPoints | 30 | 50 |
| Points assigned for a word appearing in the "ontology bread-crumb" showing the parent categories of the current page. | | |
| ArticlePoints | 10 | 50 |
| Points assigned for a word appearing in the document main body. | | |
| EmphasisPoints | 20 | 50 |
| Points assigned for a word appearing with emphasis, e.g. underlined, bold, italics, or as the anchor of a hyperlink. | | |
| MfgBonusBasis | 60 | 50 |
| Basis for a bonus to be added for a word occurring as part of a manufacturer name in the product catalog. | | |
| BrandBonusBasis | 50 | 50 |
| Basis of a bonus to be added for a word appearing as part of the brand names found within the product catalog. | | |
| SeriesModelBonusBasis | 50 | 50 |
| Basis of a bonus to be added for a word appearing as a part of the product series names and/or product model names found within the product catalog. | | |
| ProximityBonus | 15 | 50 |
| Bonus applied when a non-lower-case word is found collocated and with an established Manufacturer, Brand, or Model name, e.g. boosts "Cybershot" when found next to "Sony" even if "Cybershot" were not an established product series name. | | |
| DescriptorBonus | 30 | 50 |
| Bonus added for a word appearing within the descriptor (a descriptively referential noun-phrase) of products found within the product catalog. | | |
| DescriptionBonus | 10 | 50 |
| Bonus added for a word appearing within the long product descriptions in the product catalog. | | |
| PropertyNameBonus | 20 | 50 |
| Bonus added for a word appearing within the property names of the catalog, e.g. "CPU" or "batteries". | | |
| PropertyValueStringBonus | 25 | 50 |
| Bonus added for a word appearing within the property values of products in the catalog, e.g. "Pentium" or "NiCad." | | |
| LowFreqNameBonus | 35 | 50 |
| Bonus added for words that are almost certainly (based on case and their appearing exclusively in name fields) a brand or model name, but are low frequency, will receive a boost-otherwise their low frequency would ensure that they were left out of the kw query. | | |
| MaxKeyWords | 10 | N.A. |
| Maximum number of keywords, derived from the results of document analysis, that shall be used to construct a Boolean keyword query into the product database. | | |
| MinKey Words | 2 | N.A. |
| Minimum number of keywords, derived from the results of document analysis, that shall be used to construct a Boolean keyword query into the product database. | | |
| PreferredMinScore | 50 | N.A. |
| Minimum score of a keyword, after document analysis, in order for it to be included in the Boolean query; this is relaxed if MinKey Words is not satisfied. | | |

As can be seen, TABLE 2 sets forth weighting points and the decay percentages for corresponding constants that may apply to the words of the web page parsed. These constants are identified in the "Name" column, a brief description of the constants being provided therein. As also discussed below, corresponding weight points and decay percentages are assigned for each instance of the word for which the constant applies. For example, upon parsing, if a word, e.g. "Sony", is found in the document title which appears in the window bar of the browser, the word is assigned the TitlePoints, in the present example, 50 points so that the word score is increased by 50 points in the word analysis map. Supposing the word is found again in plain text in the main body of the document, then the word receives additionally ArticlePoints, in the present example, 10 points, so that the word score is increased by 60 points.

In addition, the "Decay" column sets forth the key factor in determining the slope of the mathematical falling-off of the points added in the case of repeated instances of the conditions which trigger the application of the points. Thus, repeat occurrences of the same word in the same document object will carry a gradually decreasing amount of bonus points for that word so that the word score is increased by a decreasing amount. In the above example, if the word "Sony" is found two more times in the main body, the first of the two instances will increase the word score by 5 points, while the second of the two instances will increase the word score by 2.5 points, owing to decay, so that the total increase in the word score in the word analysis map would then be 67.5 points. The constants with their respective weight points and decay percentages as set forth in TABLE 2 may be stored in the database 13 and controlled by the processor 12 so that the corresponding information can be quickly retrieved and applied by the analysis module 16.

Some of the constants in TABLE 2 (namely, PropertyNameBonus, PropertyValueStringBonus, LowFreqNameBonus) aim to purposely biasing of the word scoring of a word. Specifically, these constants weigh in favor of words that are more likely to be related in a meaningful way to products, rather than other random or ordinary words in the English language. This bias is advantageous in that it serves well the purpose to which the word scores used, namely, the construction of a Boolean keyword query for searching the product database 34 as described in detail below. The resulting sub-set of highest scoring words will then be not a completely balanced representation of the document's overall contents. Instead, resulting sub-set of highest scoring words will be a somewhat relatively balanced representation that over-represents words and phrases that are more likely to be product related, while under-represents words and phrases that are more likely to be product related.

For example, the word "Sony" may rank only 25th among the most frequent words in the document, and "privilege" may rank first. However, if "privilege" is a very rare word in the product database 34 and "Sony" is a very common word, then the above described method will bring about the effect of "Sony" being scored higher that "privilege". This provides a beneficial effect of our actually finding more matches in the product database 34 that are potentially relevant and associable to the web page.

Where bonuses appear in TABLE 2 as a "bonus basis" rather than simply a bonus, the basis is first factored against another relevant metric. For the Manufacturer, Brand, and Model bonuses, the basis is multiplied by the inverse of the word's common corpus frequency score. Thus, for example, "Smith" in the brand name "Smith and Barney" will get a lower bonus because it is a common word in the English language. This is advantageous because, in this example, even though "Smith" is a valid part of a popular brand name, it is much more often a word not related at all to products, and therefore, odds are that when found in a general web page, it is not going to turn out to be the basis of a good product-related word match.

Of course, it should be understood that the various constants for words and the corresponding weight and decay percentages set forth in TABLE 2 discussed above are merely provided as one example embodiment and the present invention is not limited thereto. The values given in the table are for illustrative purposes only, and are subject to modification and change to achieve optimal results. Thus, in other implementations, the product placement engine 10 may be provided with different constants and different corresponding weighting points and decay percentages.

As can appreciated by examination of the names of the various constants set forth in TABLE 2, the parser 14 and the analysis module 16 of the described embodiment parse and analyze the entire web page, and not just the prose text in the main body of the web page. The section of the document in which the word is found can impact which constant from TABLE 2 is applicable. Thus, the parser 14 obtains the meta-tagged keywords, meta-tagged description, title from window bar, headings, sub-titles, etc. This may be attained using Document Object Modeling or other similar procedures known in the art. If meta-tagged keywords are not present, heuristic processes for extracting the keywords from the document may be used, ranging from executing an advanced document summarizer, to simply extracting words most frequently occurring in the titles and section headings of the web page. As part of the Document Object Modeling analysis, sections of the web page deemed to be superfluous to the main thrust of the document can be excluded from the analysis. Such sections may include advertisements, navigation links to other unrelated articles, etc.

Of course, the prose text in the main body of the web page itself is also parsed and analyzed by the parser 14 and the analysis module 16, respectively. In parsing the prose text in the main body of the web page, emphasis factors such as bold, italic, etc., are also noted for each word and the corresponding EmphasisPoints set forth in TABLE 2 are assigned so that the word score for the word is correspondingly updated. As noted, the various constants for words and the corresponding weight and decay percentages set forth in TABLE 2 discussed above are merely provided as one example embodiment and the present invention is not limited thereto.

In the above described manner, the analysis module 16 calculates adjustments to the word score using the various constants as set forth in TABLE 2, and updates the analysis statistics and the word score in the word analysis map. As noted above, for each occurrence of a word, a determination as to whether a constant applies is made by the analysis module 18 and the corresponding weight points assigned in TABLE 2, with the decay percentages factored therein, added to the word score.

For all Names set forth in TABLE 2 that are identified as a bonus, synonyms, hypernyms, or hyponyms of the words may be partially counted as an occurrence of the word so that only a portion of the corresponding points are assigned. In addition, for triggering the bonuses for the constants named Manufacturer, Brand, Series, and Model, an alias table that sets forth alternative strings and/or wildcards can be provided in the database 13 which is referred to by the analysis module 16 so that different aliases are counted as being the same. For example, an alias table may be provided in the pre-processing database that indicates that "Sound Blaster" and "SoundBlaster" are the same, and that "Sony" and "Sony, Inc." are the same. In the foregoing example of the word "Sony", where the word score is increased by 67.5 points, if an instance of "Sony, Inc." occurs in the web page, it would be a match to the word "Sony" and the word score for "Sony" would be increased an additional 60 points.

For analysis of ontology associated words, for example, as identified in the constant named AncestryPoints, the analysis module 16 may be adapted to use ontology synonyms and hyponyms as well, such synonyms and hyponyms being stored as a list in the database 13. For each of these bonuses, the normalized score of the frequency of the word in question from the product database 34, for each of the given fields, is multiplied into the bonus. This helps to boost the score of prominent words from each field. For example, the normalized frequency score of "Sony" in the manufacturer field in the product database 34 may be 0.9, whereas "Nikon" may only be 0.5. This means that, all things being equal, the word "Sony" will be more preferable than "Nikon", especially with regard to the probability of the rest of the words selected satisfying all of the keywords (i.e. intuitively, Sony has more of a variety of products, hence more likely to find a product relevant to the web page).

Generally, a word being more prevalent in the web page results in assigning of greater weight (i.e. points) in the above analysis by the analysis module 16. However, some exceptions are preferably made by the product placement engine 10 to compensate for the fact that some words are commonly used. In this regard, a differential analysis of frequency may be performed which compares the web page or pages of the client's website to the general corpus of English text so that words commonly found during the parsing and analysis by the product placement engine 10, but also common in English generally, will not be over-weighted.

Conversely, the "LowFreqNameBonus" constant listed in TABLE 2 ensures that words which are, with a high degree of certainty, a brand or model name, will not receive a very low weight just because of the fact that such words are rare in the web page or pages of the client's website, for example, the brand name "Integron". In this regard, low frequency words that are found in the manufacturer, brand, or model identification fields of the database are given a bonus if they are also always found in non-lowercase form, as this probably indicates a type of proper name that is going to be of low frequency, but is the paradigmatic word of interest. For example, there may be only three occurrences of the word "iPod" (i.e. assuming there were only three versions of the iPod product), hence the frequency score would be very low. However, one would expect that if a web page mentioned the word "iPod", that the products in the products database that is identified by the search engine 21 would include the iPod products.

The keyword construction module 20 of the product placement engine 10 then normalizes the word scores of the words of the web page as analyzed in the manner described above on a 0.0 to 1.0 scale. An example result would be that the product name field and brand field would be ranked high (e.g. 0.95), and the specifications of less importance ranked low (such as connectors included on a camera, e.g. 0.30). The keyword construction module 20 then selects the words from the analyzed web page having the highest word scores as "keywords" for use in constructing a keyword query. It should be noted that normalization of the word scores need not be performed in other embodiments. Instead, words having the highest word score may be selected for use as keywords. As a result of the above described analysis, the various top scoring words are those hypothetically most likely to be associated with products that would be deemed relevant to the analyzed web page and can be associated therewith.

The keyword construction module 20 constructs a keyword query from the words with the highest scores, i.e. keywords. The number of keywords selected by the keyword construction module 20 may be predetermined by the administrator of the product placement engine 10, or otherwise selected by the product placement engine 10. In this regard, a range in the number of keywords to be selected may be provided. In addition, a minimum score may be required for the word to be selected. The keyword construction module 20 assembles a query string of the keywords using an inclusive Boolean "OR". In a preferred embodiment, the keywords may be modified to include wildcards. Such a feature may be limited to words longer than two characters in length and having no numeric digits as a character. In addition, stemming and/or inflection for the keywords may also be utilized.

As noted, the product placement engine 10 also includes a search engine 21 that searches for the constructed keyword query in the products database 34. The search engine 21 identifies and returns a list of products from the product database 34. In other words, the search engine 21 identifies those products satisfying the auto-created search query from the products database 34. The identified and returned products listed each have an initial product score based on the number of keyword matches found. This product score is then updated in the manner described below, the updated product score being used to facilitate selection of the products to be associated with the web page.

One advantageous aspect of using search engine 21 and providing an initial product score based on the number of keyword matches found (and not just tossing out the relevance/match scores) is that there are heuristics that may be useful in determining which products are to be selected for association with the web page. Hence, the presently described embodiment piggy-backs off of this relevancy and preserves it.

The product records associated with the list of products identified and returned by the search engine 21 are then retrieved from the product database 34. It should be understood that the term "product record" as used herein refer not only to the specifications of the product, but also external documents and other information about the product, including but not limited to, the manufacturer's product page on their website, the user manual for the product, marketing collateral documents for the product, merchant or reseller web pages concerning the product, reviews of the product, sales data about the product, popularity data on the product, etc.

These retrieved product records are further processed by the post processing module 22 to select the most appropriate products which can be associated with the web page analyzed from the list of identified products. Rather than assuming that a simple keyword search match provides accurate and desirable results for products, the product placement engine 10 in accordance with the present invention further evaluates each of the products identified in the search results returned by the search engine 21, and updates the scores of the products in the manner described below to select the most appropriate products. This re-scoring or updating of the product score is performed by parsing and analyzing the retrieved product record and any other textual information associated with the identified products that were returned by the search engine 21. The parsing function may be performed by the parser 14 or the post processing module 22 itself.

More specifically, each of the product records associated with the identified products are retrieved and parsed by the post processing module 22, and each of the words in the product record are compared to the words of the original source web page (i.e. the web page from which the key words were derived). In the illustrated embodiment, all of the words of the product record are compared to all of the words from the original source web page, and not just to the keyword query words that were auto-created from parsing and analysis of the web page. If there is a match between a word of the product record and a word in the web page, the product score of the product associated with the product record is updated by adding, combining, or otherwise processing the product score with the amount of the word score set forth in the word analysis map of the particular word. Thus, the updating of the product score in this manner reflects the various "bonuses" set forth in TABLE 2 since the word score incorporated the weightings.

In addition, various penalties and other constants are applied in updating the product score based on matching of a word in the product record with a word in the web page. These penalties and other constants are set forth in TABLE 3:

TABLE 3

| of Constants Defined | | |
|---|---|---|
| Name | Weight | Decay |
| KWMatchDecay<br>For each occurrence of the word in the product record, the *original* score of the keyword (calculated in preprocessing phase) is added into a final score variable *for each keyword occurrence*, with the decay multiplied into the keyword's original score for each occurrence. | N.A. | 50 |
| ExtraWordPenalty<br>Decrease of any aforementioned "bonus" for each additional | 10 | N.A. |

TABLE 3-continued of Constants Defined

| Name | Weight | Decay |
|---|---|---|
| word found in the same field that is not included in the selected keyword set. | | |
| RegKWScorePercInclude<br>Proportion of final product score that derives from the original keyword search score (the difference between this number and 100 reflects how much of the final score will derive from all possible bonuses). | 70 | N.A. |
| DomainPenalty<br>Handicap applied to put items of a certain product domain, e.g. media items (books, movies, music, posters, magazines) generally below products of other domains Employed mostly to achieve business objectives. | 50 | N.A. |

The word score is processed, for example, added with the product score, applying the KWMatchDecay for each occurrence after the first. Each of the words that is not found in the original document, contributes a penalty of ExtraWordPenalty as set forth in TABLE 3. The bonus for ideal price range as defined in the constant IdealPriceMid is dynamically adjusted for the domain most prominent among the results. Thus, the present embodiment gives preference to product that falls within a particular price range.

In those instances where the keywords found are 2- or 3-word collocations, and if the keyword search supports only single words, then the post-processor module 22 may be adapted to re-check the search results to ensure that collocations were found in whole, rather than disjointed. This would require that that the statistical occurrences of these collocations be recorded during the preprocessing phase. Moreover, additional step of eliminating near-duplicate products may further be performed by the post processing module 22. Duplication may be based on a determination that the brand, the price, and the specifications for two products listed are the same or similar. In such an instance where duplication is likely, the oldest and/or lowest scoring product that is listed can be eliminated.

In still other embodiments of the present invention, additional adjustments to the bonuses set forth in TABLE 2 may be implemented by the post processing module 22. For example, bonuses may be provided based on preferred brands or resellers, based on recency where newer products are weighted more highly than over older products, based on popularity where top-selling or most-requested products are weighted more highly, and/or based on existence of content such as images, specifications, product briefs, reviews, and/or user opinions. In particular, such "Secondary-level bonuses" may include any bonuses keyed to information outside of the material specifications or manufacturer product data on the product, but include information which is external, yet importantly related, to the product, such as its popularity in the marketplace, the use-case scenarios in which it is commonly used, professional reviewers' evaluative ratings of the product, and/or other external information related to the product. As such, these bonuses technically have nothing to do with the original text, but are purely reflective of how preferable a product is from the point of view human interests such as merchandizing, marketing, and probably user satisfaction. Examples of such secondary bonuses are set forth in TABLE 4:

TABLE 4

SECONDARY BONUSES TABLE

| Bonus | Points | Decay |
|---|---|---|
| IdealPriceHi<br>Ideally the price above which candidate products should be rejected. | 5,000 | N.A. |
| IdealPriceLo<br>Ideally the price below which candidate products should be rejected. | 20 | N.A. |
| IdealPriceMid<br>Ideally the target price most preferred for a candidate product. | 500 | N.A. |
| Popular info request bonus (multiplied by percentile rank of product relative to all others within the catalog, based on information requests) | 40 | n.a. |
| Popular price request bonus (multiplied by percentile rank of product relative to all others within the catalog, based on price requests) | 50 | n.a. |
| Sales bonus (multiplied by percentile rank of product relative to all others within the catalog, based on sales data) | 60 | n.a. |
| Professional Reviews Bonus (points for each review existing from a compendium of respected review sources) | 10 | .50 |
| Average Professional Review Score Bonus (bonus multiplied by normalized rating of plural number of professional reviews) | 70 | n.a. |
| User Reviews Bonus (bonus multiplied by normalized percentile score of number of reviews relative to other products in the same category of approximately the same release date) | 15 | n.a. |
| Average User Review Score Bonus (bonus multiplied by normalized rating of plural number of professional reviews) | 30 | n.a. |
| Release Date Recency | 40 | 0.98 |

TABLE 4-continued

SECONDARY BONUSES TABLE

| Bonus | Points | Decay |
|---|---|---|
| Bonus (Product released today gets full bonus, bonus decaying exponentially toward zero with time) | | per day |
| Market availability (based on number of independent resellers offering product, and the number of those that are in stock instead of out-of-stock, and the number of those that are not refurbished but actually brand new product) | 50 | n.a. |

Upon updating the product scores of the listed products returned by the search engine 21 in the above described manner, the post processing module 22 re-sorts the list based on the results of the updating and those products having the highest products scores are selected for association with the original source web page. The number of products selected may be predetermined by the administrator of the product placement engine 10, or otherwise selected by the product placement engine 10. A minimum score threshold may be applied by the post processing module 22 so that those products having a score that is below the minimum score threshold are discarded. The re-sorted list of products is provided to the display module 28 that sends the results to the client 40 for display as advertisements or links, or in other format as being products that the user may want to consider.

Figure 2:
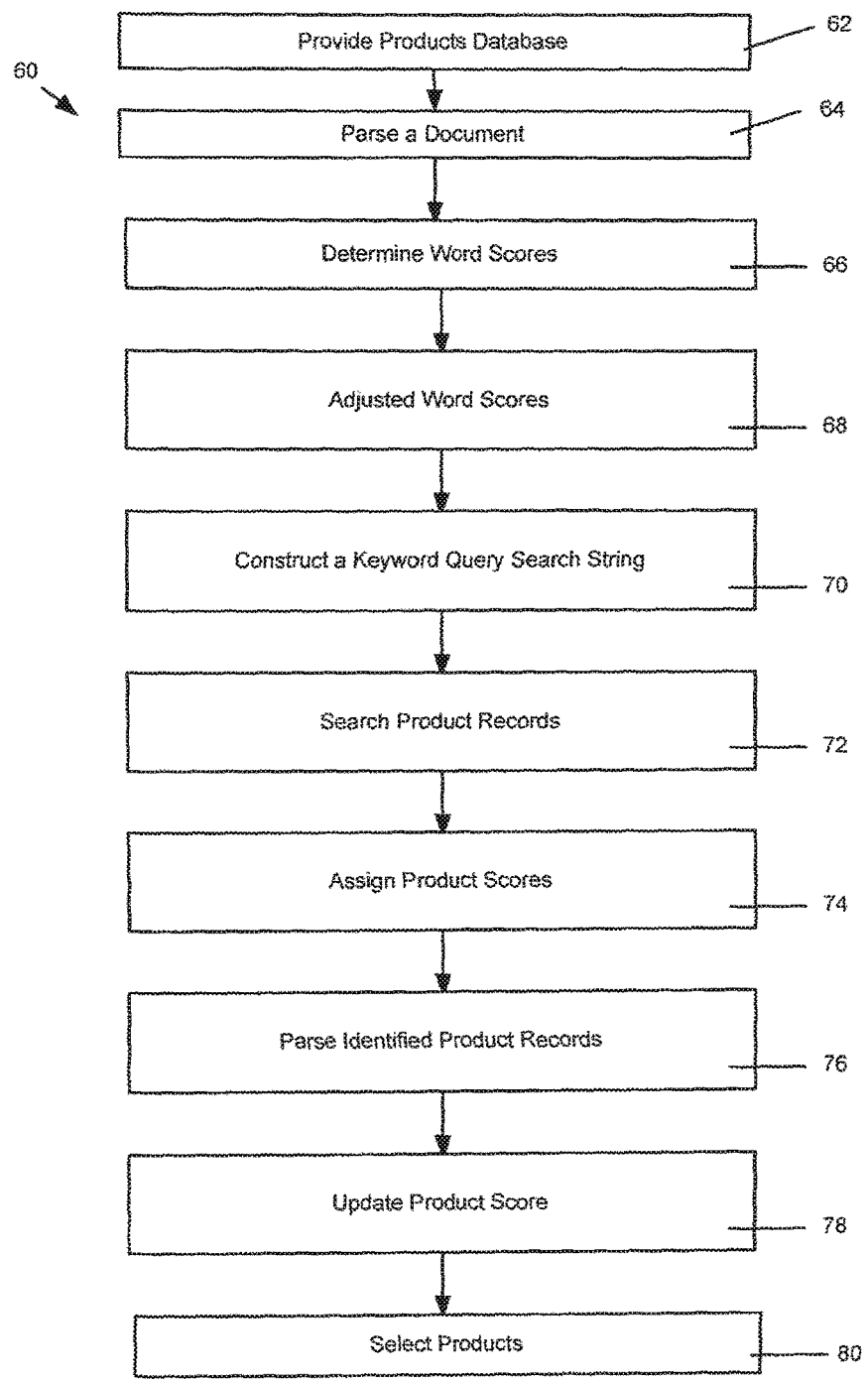
FIG. 2 is a flow diagram schematically illustrating one example method in accordance with another aspect of the present invention.

In addition, it should also be evident to one of ordinary skill in the art that another aspect of the present invention is a method for analyzing web pages. In this regard, FIG. 2 is a flow diagram 60 schematically illustrating one example method. As shown, method includes providing a products database having product records containing information regarding an associated product in step 62, parsing a document in step 64, and determining word scores of the words in the document based on the frequency of the words in the document in step 66. The word scores are adjusted by predetermined weightings corresponding to the use of each word in the document in step 68, and a keyword query search string is constructed using words having the highest word scores in step 70. In step 72, the product records of the products database are searched to identify products satisfying the keyword query search string, and in step 74, product scores are assigned to the identified products based on matches to the keyword query search string. The product records are parsed in step 76 to identify word matches in each of the product records and the document. The product score is updated in step 78 by processing the adjusted word scores corresponding to the matched word with the product score of the product for which word matched. In step 80, products from the identified products that have the highest updated product scores are selected.

As can be appreciated from the above discussion, the present invention may be used to take a web page from any type of website, and relate products to the content of the web page. This may be practiced the client site placing a link into their site that sends a message to the product placement engine of the present invention instructing to analyze the web page. The product placement engine sends back links to products on the host site to thereby facilitate contextual marketing.

In view of the above, it should now be evident to one of ordinary skill in the art how the present invention provides a method and system that minimizes the above noted disadvantages associated with present systems and methods for identifying products appropriate for being associated to a web page. In addition, it should be evident how the present invention minimizes cost and can identify products substantially automatically with minimal input from the administrator or other personnel.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A method, executed within a computing system including multiple devices coupled to one another by a computer communications network, for selecting at least one product record for association with a document displayed in a user interface rendered by a user computing device, the method comprising:
analyzing, by a server that is remote from the user device and coupled to the user computing device over the network, at least a portion of the document for at least frequency of words in the document;
constructing, by the server, a query search string at least partially based on words of the document having highest frequencies;
searching product records in a products database to identify products satisfying the query search string, the products database being remote from the server and the user computing device and coupled to the server over the network;
selecting, by the server, at least one product from the identified products for display in the user interface; and
embedding, by the server, at least product record corresponding to the at least one product into the document for display in the user interface of the user computing device, wherein the document is not stored within the products database.

2. The method of claim 1, wherein the server comprises multiple devices.

3. The method of claim 1, further comprising the user computing device making a request to the server for embedded content.

4. The method of claim 1, wherein said constructing step includes constructing a search corresponding to words of the document having the highest frequencies.

5. The method of claim 1, wherein said analyzing step includes determining use of the words in the document.

6. The method of claim 1, wherein the document is a web page.

7. The method of claim 1, wherein the user interface is a web page graphically rendered by a browser.

8. A product placement system, including multiple devices coupled to one another by a computer communications network, for selecting at least one product record for display in a user interface rendered by a user computing device, the system comprising:
an analysis module adapted to analyze at least a portion of a document for at least frequency of words in the document, the analysis module being part of a server that is remote from the user computing device and coupled to the user device over the network;

a constructor module adapted to construct a query search string at least partially based on the words of the document having highest frequencies, the constructor module being part of the server;

a search engine adapted to search product records in a products database to identify products satisfying the query search string, the products database being remote from the search engine and the user computing device and coupled to the server over the network;

a post processing module of the server adapted to select at least one product from the identified products for display in the user interface and cause at least product record corresponding to one of the selected products to be embedded into the document for display in the user interface of the user computing device, wherein the document is not stored within the products database.

9. The system of claim 8, wherein the server comprises multiple devices.

10. The system of claim 8, further comprising the user computing device making a request to the server for embedded content.

11. The system of claim 8, wherein the query search is constructed based on words of the document having the highest frequencies.

12. The system of claim 8, wherein the analyzing includes determining use of the words in the document.

13. The system of claim 8, wherein the document is a web page.

14. The system of claim 8, wherein the user interface is a web page graphically rendered by a browser.

* * * * *